Dec. 9, 1952 — A. W. KLOMP — 2,620,549
MEANS FOR CUTTING GEARS
Filed March 2, 1946 — 2 SHEETS—SHEET 1
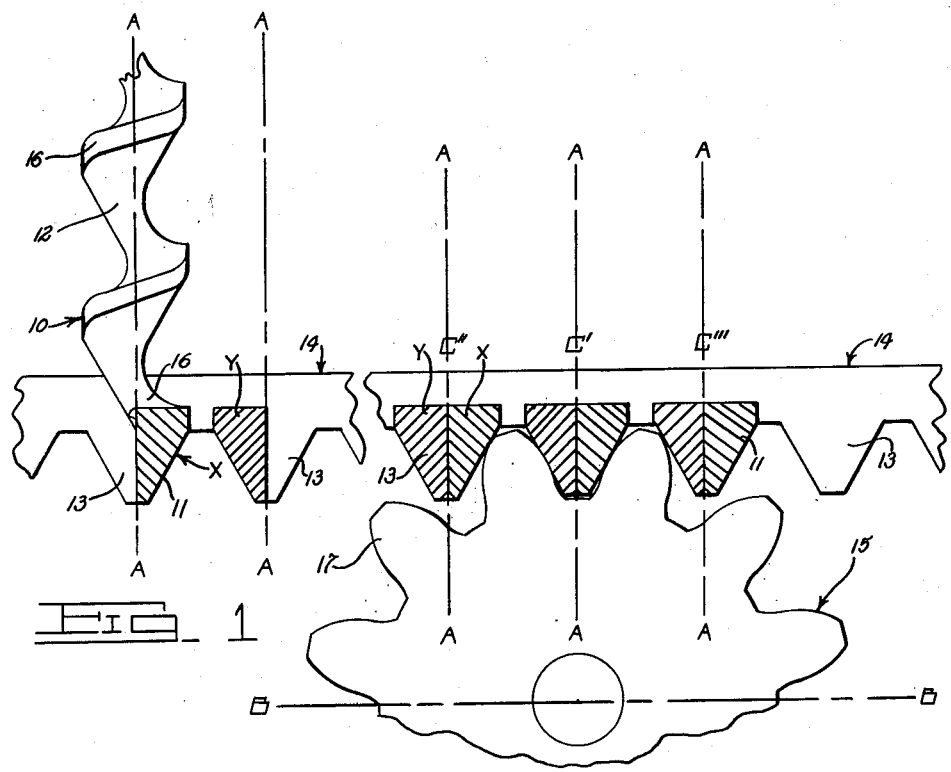
FIG. 1
FIG. 2
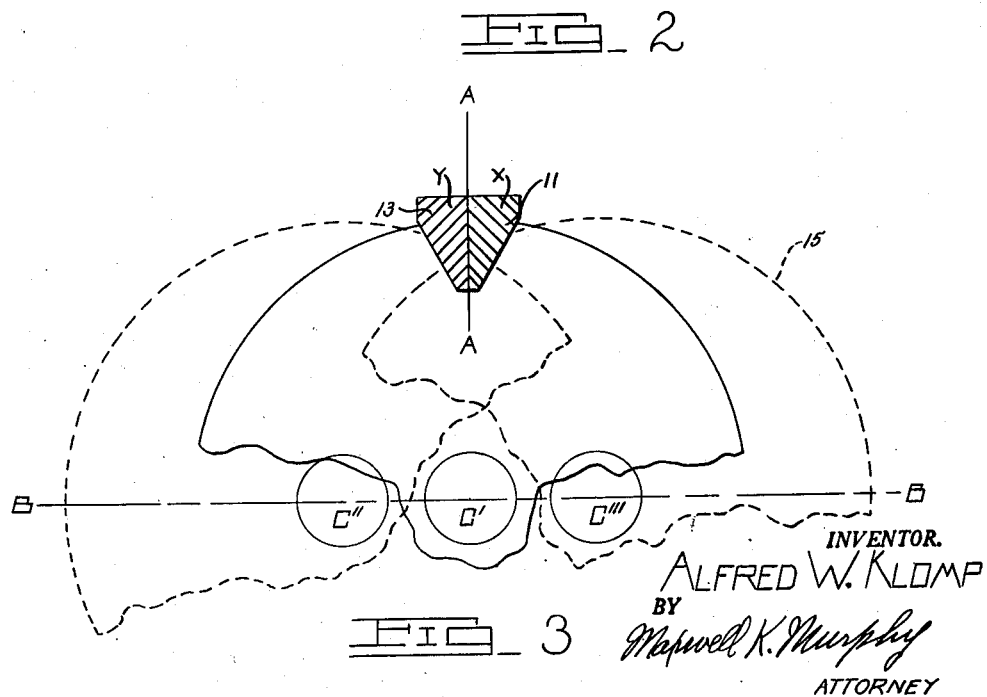
FIG. 3
INVENTOR.
ALFRED W. KLOMP
BY
Maxwell K. Murphy
ATTORNEY

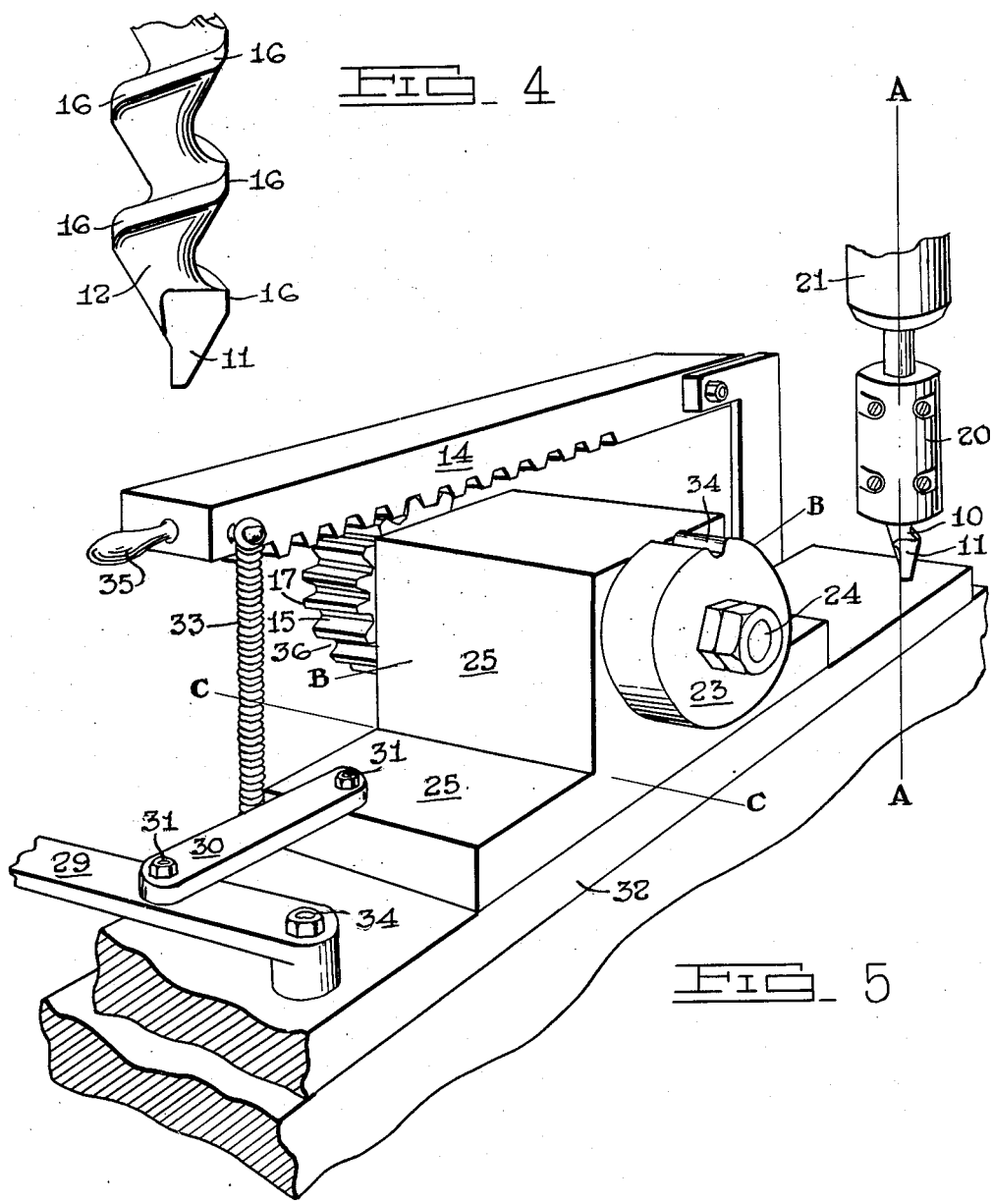

Patented Dec. 9, 1952

2,620,549

UNITED STATES PATENT OFFICE 2,620,549

MEANS FOR CUTTING GEARS

Alfred W. Klomp, Detroit, Mich., assignor to Process Gear and Machine Co., Detroit, Mich.

Application March 2, 1946, Serial No. 651,601

2 Claims. (Cl. 29—103)

The invention herein relates generally to the art of gears, sprockets, shapes and toothed members such as splines, etc., and in particular to a new, novel and useful tool for cutting gears and the like and the method of using same to generate teeth and shapes.

The tool has a cutting face and a shank with the cutting face of truncated conic section and the shank being formed by the face ascending in a helix about the tool's axis of rotation. When the tool is rotated, it revolves about its own longitudinal axis rotating the cutting face in a circle which forms a truncated cone-like cutting area.

An object of the invention is to provide a gear cutting or generating tool that has a cutting face capable of retaining its form and dimension when worn or ground back along the helical shank.

Another object is to provide a gear cutting or generating tool that can be used and sharpened until it is consumed which eliminates waste in high speed steel.

A further object is to provide a tool and a method of using same wherein the tool will generate the tooth form.

Other objects and advantages will be apparent from the following description and appended drawings, in which:

Fig. 1 shows the tool in conjunction with a basic rack;

Fig. 2 shows a basic rack working with a gear;

Fig. 3 shows the action between one tooth of a basic rack and a gear blank;

Fig. 4 is a view of the tool itself; and

Fig. 5 is a perspective view of the tool mounted in a machine for generating teeth.

In making a gear it is necessary to give the gear a useful tooth and the art has developed several systems of teeth among which are the cycloidal, segmental, involute and parabolic.

The involute system is herein referred to for purposes of explanation and illustration as it embodies the simplest and best tooth curve, theoretically, as well as being one, of the greatest practical use in gearing. It is not intended to limit the use of the tool to this one system as the tool is adaptable to the other systems as well.

When a basic rack is used to cut a tooth in a gear, it "generates" the tooth as it forms a surface on the workpiece that is not the complement of the rack's tooth surface, but conjugate to it. The term "generate" is herein used in such a sense.

As the cutting face of the tool herein is of conic section in shape, and as it cuts on a conjugate curve, it "generates" the teeth as it forms a surface on the work that is neither the complement nor the equal of the cutting face.

In adapting the tool to the involute system, the conic section formed by the cutting face is approximately equal to one half of the conic section formed by a basic rack tooth. As the cutting face of the tool rotates in a circle, the tool is equal to a whole basic rack tooth as is hereinafter more fully described. The tool cuts on a single line of obliquity, the same as a basic rack tooth.

Tool 10, Figs. 1 and 4, has cutting face 11 of truncated conic section approximately equal to one half of basic rack tooth 13 and which bears shoulder 16. The face 11 ascends in helix 12 which forms the shank of the tool 10 with the shoulder 16 providing an area along the shank for holding the tool 10 in a holder, chuck or collet. The tool 10, revolves about its own longitudinal axis A—A with the face 11 changing from position X to Y, Figs. 1, 2 and 3, and covering all points therebetween which gives the face 11 a cutting circle equal to a whole tooth 13 of basic rack 14.

Gear 15, Fig. 2, is shown in working relation with the basic rack 14. The teeth 13 of the rack 14 mesh and work with teeth 17 of the gear 15 and are shaded to illustrate the cutting arcs of the face 11 of the tool 10 when the tool 10 rotates about the axis A—A. This illustrates the action between the tool 10 and a gear 15.

The basic rack tooth 13, Fig. 3, is shaded to represent the cutting arcs of the face 11 of the tool 10 and illustrates the action between one tooth 13 of a rack 14 in working relation to a gear 15. It can be seen that the positions C-1, C-2 and C-3 of Figs. 1 and 2 are identical in action relative to a rack tooth 13 working with a gear 15 with the axis of the gear 15 moving back and forth in the plane B—B. It can also be seen that the cutting arcs of the face 11 are equal to a whole tooth 13 of a rack 14. Thus the tool 10 is capable of working with a gear 15 as a rack tooth 13 equivalent.

The tool 10, Fig. 4 is shown with a quick helix for strength purposes in the shank thereof as the helix of the face 11 winds upon itself thereby providing more material in the shank.

The tool 10, Fig. 5, is mounted in holder 20 which is in turn mounted in rotary head 21 of a machine, not shown. When the head 21 rotates the tool 10 is rotated about its axis A—A and the face 11, describes an arc as previously mentioned in relation to Figs. 2 and 3.

Gear blank 23 is mounted on spindle 24 which is journaled in member 25. Also mounted on the spindle 24 is the master gear 15 which works with the stationary basic rack 14, equipped with the teeth 13. The member 25 is adapted to move on slide 32 in a horizontal plane B—B preferably positioned at right angles to the vertical axis A—A of the tool 10. Spring 33 holds the rack 14 in fixed relation to the gear 15.

Lever arm 29 is connected to the member 25 by connecting arm 30 and bolts 31 and is anchored by stud 34. By moving the lever 29 back and forth, the axis of the member 25 is moved in the horizontal plane B—B which is the same as the plane B—B of Figs. 2 and 3. As the rack 14 is stationary, the gear 15 rotates the spindle 24 which in turn rotates the gear blank 23 as the spindle 24 is journaled in the member 25 and moves with member 25 in the plane B—B. This action moves the gear blank 23 through the positions C-1, C-2 and C-3 as illustrated in Figs. 2 and 3 and through all positions in between the illustrated positions as the gear blank 23 is mounted on spindle 24. Thus the movement of the gear blank 23 is a rocking motion, when the member 25 is moved back and forth.

The slide 32 is adapted to move in a horizontal plane C—C by conventional means, not shown, which allows the gear blank 23 to be moved into the area of the cutting path of the tool 10 as the member 25 is positioned on the slide 32 and the spindle 24 carrying the gear blank 23 is journaled in the member 25.

In action, the tool 10 and the lever 29 are powered with the tool 10 rotating and the gear blank 23 rocking about its axis and moving back and forth in the horizontal plane B—B. The slide 32 is then advanced in the direction of the rotating tool 10 which causes the cutting face 11 of the tool 10 to come in contact with the gear blank 23 which cuts the slot 34 in the gear blank 23. After this slot is completely cut, the master gear 15 is advanced one tooth in relation to the rack 14 by lifting one end of the rack 14 by the handle 35 which positions the gear blank 23 for cutting another slot 34. This is facilitated by the spring 33. The action is repeated until slots 34 are cut all the way around the gear blank 23.

The action of the cutting circle of the tool 10 in relation to the gear blank 23 is the equivalent of the rack tooth 13 in relation to the master gear 15, with the slots 34 the equivalent of slots 36 and with the material between the slots 34 the equivalent of the teeth 17 thereby forming the gear blank 23 into a gear.

The relation of the cutting tool and the gear blank in Fig. 5 can now be seen to be illustrated by the action of one tooth 13 in Fig. 3 in relation to a gear 15 which rotates on its axis in the plane B—B. Also it can be seen from Fig. 3 that the cutting edge of the tool cuts a greater space than the angle of the tool's side makes with the base; with the result that the tool cuts a conjugate curve as it makes a greater cut in area in the work due to the action of the work rotating or rocking about an axis and moving in horizontal plane B—B in relation to the vertical axis A—A about which the tool 10 rotates.

Referring to Fig. 4, it can be seen that the cutting face 11 of the tool 10 ascends the helix 12 so that in sharpening the tool the proportion of the cutting face remains the same and that the tool can be used and sharpened along its entire length without changing the configuration of the cutting face 11.

For purposes of explanation, it is considered that the cutting face illustrated in the drawings is in a plane radially extending from the axis of the tool. However, the face may be ground above or below the axis of the tool and at an angle to the axis of the tool or both or concave or convex which will result in cutting faces of truncated conic sections as the shape of the helix 12 is conical. Other adaptations, omissions and substitutions can be made in connection with this invention without departing from the spirit thereof or the scope of the appended claims such as causing the head 21 to move in a horizontal plane while the member 25 is stationary.

I claim:

1. A gear generating tool adapted to be rotated about its longitudinal axis including, a spiral land and a spiral conical section extending from the outer edge at one side of the spiral land toward the center of the tool and terminating substantially at the longitudinal axis of the tool, and a sharpened face at the end of the tool extending in a plane radially and longitudinally to the axis of said tool and in the area of said spiral land and said conical section to thereby form a cutting edge at the end of the tool and the conical section.

2. A gear generating tool adapted to be rotated about its longitudinal axis including, a spiral land and a spiral conical section extending from the outer edge at one side of the spiral land toward the center of the tool and terminating substantially at the longitudinal axis of the tool, and a sharpened face at the end of the tool extending in a plane radially and longitudinally to the axis of said tool and in the area of said conical section to thereby form a cutting edge at the end of the tool and the conical section.

ALFRED W. KLOMP.

REFERENCES CITED

The following references are of record in the file of this patent:

UNITED STATES PATENTS

| Number | Name | Date |
| --- | --- | --- |
| 49,881 | James | Sept. 12, 1865 |
| 739,537 | Francis | Sept. 22, 1903 |
| 1,631,641 | Montstream | June 7, 1927 |
| 1,680,258 | Schurr | Aug. 7, 1928 |
| 1,935,555 | Gorton | Nov. 14, 1933 |
| 1,983,019 | De Leeuw | Dec. 4, 1934 |
| 2,129,417 | Case | Sept. 6, 1938 |
| 2,333,156 | Dougherty | Nov. 2, 1943 |
| 2,344,323 | Pelphrey | Mar. 14, 1944 |
| 2,349,959 | Guetzkow | May 30, 1944 |
| 2,377,329 | Dettmer | June 5, 1945 |

FOREIGN PATENTS

| Number | Country | Date |
| --- | --- | --- |
| 144,065 | Switzerland | Mar. 2, 1931 |